(12) United States Patent
Heinzen et al.

(10) Patent No.: US 8,913,844 B2
(45) Date of Patent: Dec. 16, 2014

(54) REDUCING SENSOR AND READOUT CIRCUITRY NOISE IN DIGITAL DOMAIN USING REFERENCE PIXELS

(75) Inventors: Katherine R. Heinzen, Fairfax, VA (US); Semion Kizhner, Reisterstown, MD (US); Maxime Pinchinat, Beltsville, MD (US); Thomas P. Flatley, Hungtingtown, MD (US); Dominic J. Benford, Potomac, MD (US)

(73) Assignee: The United States of America as represented by the Administrator of the National Aeronautics Space Administration, Washington, DC (US)

( * ) Notice: Subject to any disclaimer, the term of this patent is extended or adjusted under 35 U.S.C. 154(b) by 380 days.

(21) Appl. No.: 13/489,073

(22) Filed: Jun. 5, 2012

(65) Prior Publication Data
US 2013/0322781 A1    Dec. 5, 2013

(51) Int. Cl.
*G06K 9/40* (2006.01)
*G06K 9/54* (2006.01)
*G06K 9/60* (2006.01)
*G06K 9/36* (2006.01)
*G06K 9/00* (2006.01)

(52) U.S. Cl.
USPC ............ 382/275; 382/302; 382/100; 382/276

(58) Field of Classification Search
None
See application file for complete search history.

(56) References Cited

U.S. PATENT DOCUMENTS

| | | | | |
|---|---|---|---|---|
| 3,629,499 | A * | 12/1971 | Carlson | 348/164 |
| 8,306,610 | B2 * | 11/2012 | Mirow | 600/509 |
| 8,711,249 | B2 * | 4/2014 | Baqai et al. | 348/241 |
| 2011/0052088 | A1 * | 3/2011 | Yuan et al. | 382/248 |
| 2012/0089372 | A1 * | 4/2012 | Pao et al. | 702/190 |
| 2013/0058562 | A1 * | 3/2013 | Chen et al. | 382/154 |

OTHER PUBLICATIONS

Pines, Darryll, and Liming Salvino. "Structural health monitoring using empirical mode decomposition and the Hilbert phase." Journal of sound and vibration 294.1 (2006): 97-124.*
Kizhner, Semion, et al. "On Certain New Methodology for Reducing Sensor and Readout Electronics Circuitry Noise in Digital Domain." Publication Date: Sep. 17, 2008.*
Kizhner, Semion, and Katherine Heinzen. "New methodology for reducing sensor and readout electronics circuitry noise in digital domain." Aerospace conference, 2009 IEEE. IEEE, 2009. Date of Conference: Mar. 7-14, 2009.*

* cited by examiner

*Primary Examiner* — Michelle Entezari

(57) ABSTRACT

An improved method for correcting for noise in the digital domain is disclosed. Reference pixel fast-varying components are extracted using a Hilbert-Huang Transform Real-Time Data Processing System (HHT-DPS-RT). The reference pixels are non-photon-detecting pixels in a sensor array. The fast-varying components of the reference pixels are processed in addition to the average over the remaining trend, facilitating additional noise correction for active pixels.

20 Claims, 5 Drawing Sheets

REDUCING SENSOR AND READOUT CIRCUITRY NOISE IN DIGITAL DOMAIN USING REFERENCE PIXELS

ORIGIN OF THE INVENTION

The invention described herein was made by an employee of the United States Government and may be manufactured and used by or for the Government for Government purposes without the payment of any royalties thereon or therefore.

FIELD

The present invention generally pertains to noise correction, and more specifically, to a noise correction array for large spaceflight sensors carrying reference pixels.

BACKGROUND

In advanced conventional light collection technologies, such as those used for telescope applications in space, it is often beneficial to utilize a large sensor array with a large number of pixels. For instance, the HgCdTe Astronomy Wide Area Infrared Imager with 2K×2K Resolution, Reference Pixels and Guide Mode ("H2RG™"-trademark of Teledyne Imaging Sensors) sensor reads out from approximately four million sensor pixels and multiplexes the readout to 1, 2, 4, 8, 16, or 32 output channels. Such sensors may be capable of detecting low level photon emissions that are outside of the visible light spectrum, such as near-infrared ("NIR"), which has wavelengths varying from slightly less than 1 micrometer up to approximately 5 micrometers.

In addition to the measured (or "hot") pixels that detect a phenomenon of interest photon emissions, such sensor arrays generally include non-illuminated reference pixels that do not actually register radiation that is illuminating the array. These reference pixels are a type of noise correction technology for the digital domain, in addition to a single analog reference pixel that is generally subtracted from all hot pixels of the sensor array on the sensor. The reference pixels are read out and digitized with hot pixels as a single frame. Rather than trying to prevent noise from occurring by improving the quality of sensor components, an approach that is limited by physics and may be cost-prohibitive, scientists and engineers frequently seek to correct data after the analog signal has been sampled and converted from analog to digital signals (i.e., when data is in the digital domain). Further, while most types of noise can be corrected for at the analog level, certain types of noise, such as thermal noise, are difficult to compensate for. For instance, thermal noise, which is the random motion of electrons inherent in all objects at a temperature above absolute zero, is extremely difficult to compensate for without engaging in expensive cryogenic procedures. Such types of noise are best corrected in the digital domain.

In conventional averaging of reference pixel magnitudes in the digital domain, the fast-varying noise components may be modeled by sinusoids varying around zero. However, these fast-varying noise components drop out from noise calculations and remain hidden in the readout data. Accordingly, improved noise correction techniques in the digital domain may be beneficial.

SUMMARY

Certain embodiments of the present invention may provide solutions to the problems and needs in the art that have not yet been fully solved by conventional noise correction approaches. For example, certain embodiments of the present invention identify, and effectively correct, noise for fast-varying components that drop out using conventional approaches.

In one embodiment of the present invention, a computer program embodied on a computer-readable storage medium is configured to cause a processor to perform a non-destructive readout of a sensor and extract reference pixel fast-varying components (Intrinsic Mode Functions, or IMFs) using the Hilbert-Huang Transform Real-Time Data Processing System (HHT-DPS-RT). The program is also configured to cause the processor to derive a noise correction array based on a boundary condition equal to the IMFs plus an absolute value of respective minimums of the IMFs, using an embedded squares method heat propagation model. The program is further configured to cause the processor to subtract the noise correction array from the active pixels to yield active corrected pixels.

In another embodiment of the present invention, a computer-implemented method includes extracting reference pixel fast-varying components (IMFs) using the Hilbert-Huang Transform Real-Time Data Processing System. The computer-implemented method also includes biasing each IMF with an absolute value of one-dimensional minimum of the IMF to make each IMF positive and replacing inner reference pixel square parameter amplitudes with the IMFs plus the absolute value of their respective minimums. The computer implemented method further includes propagating the replaced amplitudes into an active pixels squares noise correction array and deriving a noise correction array based on a boundary condition equal to the IMFs plus the absolute value of their respective minimums, using an embedded squares method heat propagation model. Additionally, the computer-implemented method includes subtracting the noise correction array from the active pixels squares noise correction array to yield active corrected pixels.

In yet another embodiment of the present invention, an apparatus includes physical memory including computer program instructions and a processor configured to execute the computer program instructions. The processor is configured to extract reference pixel fast-varying components (IMFs) using the Hilbert-Huang Transform Real-Time Data Processing System and find a minimum for each IMF and bias each IMF with the absolute value of the one-dimensional minimum of the IMF to make each IMF positive. The processor is also configured to reduce a global trend by a subtrahend positive bias derived from the biased IMFs and average a remaining reference pixel trend for all reference pixels in the trend after the global trend reduction. The processor is further configured to replace inner reference pixel square parameter amplitudes with the IMFs plus the absolute value of their respective minimums and propagate the replaced amplitudes into an active pixels squares noise correction array. Additionally, the processor is configured to derive a noise correction array based on a boundary condition equal to the IMFs plus the absolute value of their respective minimums, using an embedded squares method heat propagation model and subtract the noise correction array from the active pixels to yield active corrected pixels.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
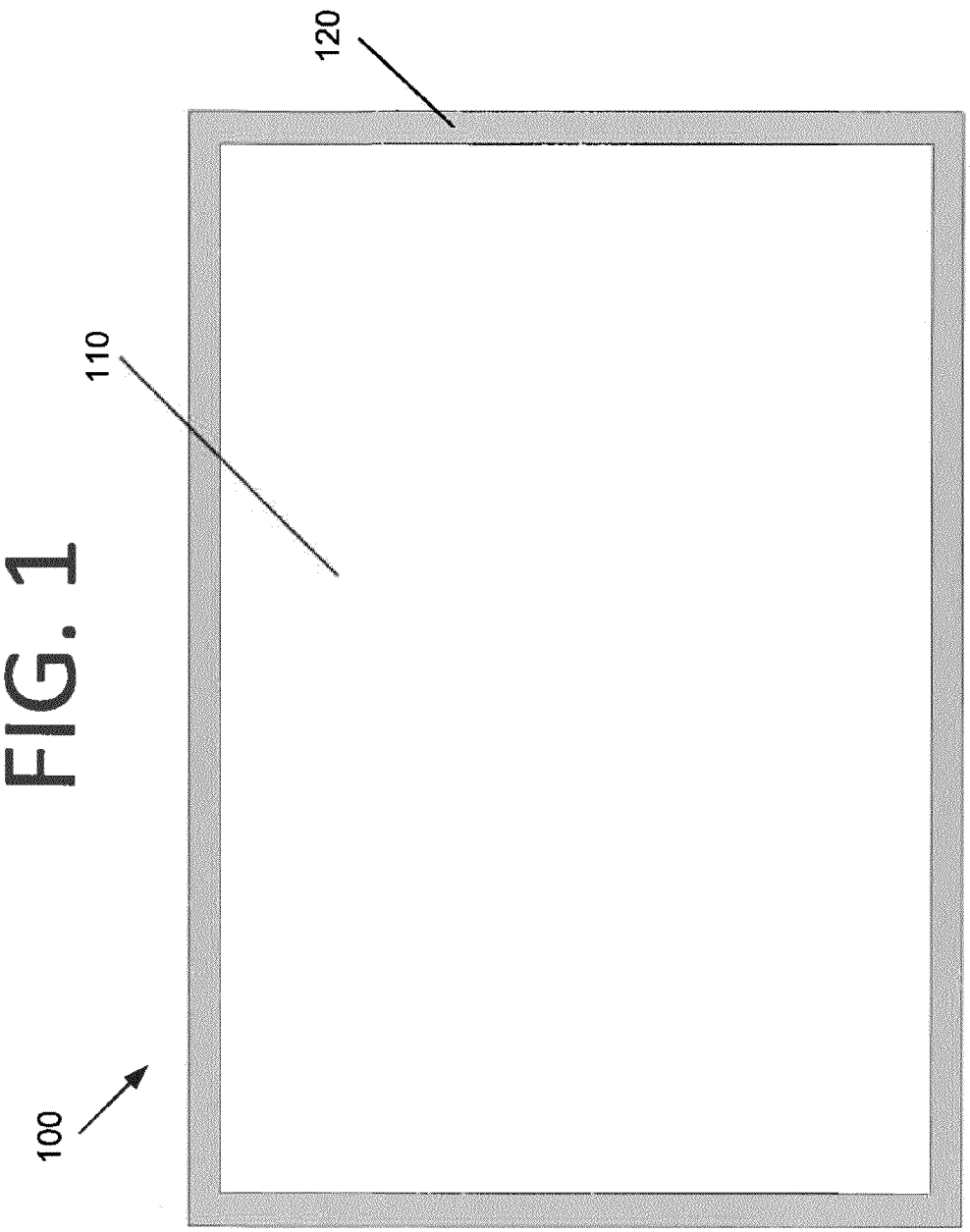
FIG. 1 illustrates a sensor array bounded by a narrow frame of reference pixels.

Embodiments of the present invention may identify, and correct, fast-varying components in reference pixel data. A fast-varying component in reference pixel data changes its sign rapidly. These components are typically represented by the first few IMFs, as opposed to the last few IMFs that form the signal trend.

Some embodiments apply the Hilbert-Huang Transform Data Processing System (HHT-DPS), which performs an empirical mode decomposition ("EMD") algorithm to break down functions (such as a row or column of reference pixels' magnitudes—a function of the index in the pixel array) into basis function components, called Intrinsic Mode Functions ("IMFs"). IMFs are formed through sifting and splining (interpolation) processes in the algorithm which produce functions having more than 3 extrema points, and the difference of the number of extrema and zero-crossings is not more than 1. Extrema points are the local maximum and minimum of a function—in other words, the largest and smallest values that a function takes within a given neighborhood. Each newly formed IMF is subtracted from the input vector to form the next function for sifting and splining.

The HHT is a two-phase process, including the Huang EMD component and the Hilbert Spectrum (HSP) component. First, the EMD decomposes a signal into IMFs and secondly, the HSP generates instantaneous frequency data. An IMF is defined as a function satisfying the following requirements: (1) in the whole data set, the number of extrema and the number of zero-crossings are either equal or differ at most by one; and (2) at any point, the mean value of the envelope defined by the local maxima and the envelope defined by the local minima is zero. Per the above, the procedure for extracting an IMF is called "sifting". The sifting process includes: (1) identifying all of the local extrema in the data; (2) connecting all of the local maxima by a cubic spline line as the upper envelope; and (3) repeating the procedure for the local minima to produce the lower envelope.

The EMD component of the HHT is an empirical procedure as described above. The HSP component of the HHT is based on the classical Hilbert Transform for 1-D functions of a real variable $x(t)$. The HSP component integrates $x(t)$ with the Hibert kernel and produces an imaginary function $y(t)$. The signal $s(t)=x(t)+i*y(t)$ is an analytical signal that allows derivation of the input signal instantaneous frequency for $x(t)$.

The HHT formulation was implemented as a computer program in a practical implementation. The Hilbert Huang Real-Time Data Processing System for 1-D (HHT-DPS-RT, or HHT1) specifically may be used for noise reduction in the digital domain. HHT1 is applied to 1-D rows and columns of reference pixels to derive boundary IMFs that are used to generate the noise correction array.

The reference pixel fast-varying components, or fast-varying noise components, are extracted using a HHT in one dimension (HHT1). Essentially, the input to HHT1 is a vector or a signal function of one variable—the rows and columns of reference pixels. The fast-varying components are the first IMFs of the inner square of the reference pixels (IMF1s). For the purposes of this disclosure, fast-varying components, fast-varying noise components, first IMF, and IMF1 are equivalent. In each IMF, the minimum (MIN1) is next found, and the IMF is biased with the absolute value of the minimum to make the IMF positive. This facilitates averaging of the IMFs without the need to zero them out.

Figure 4:
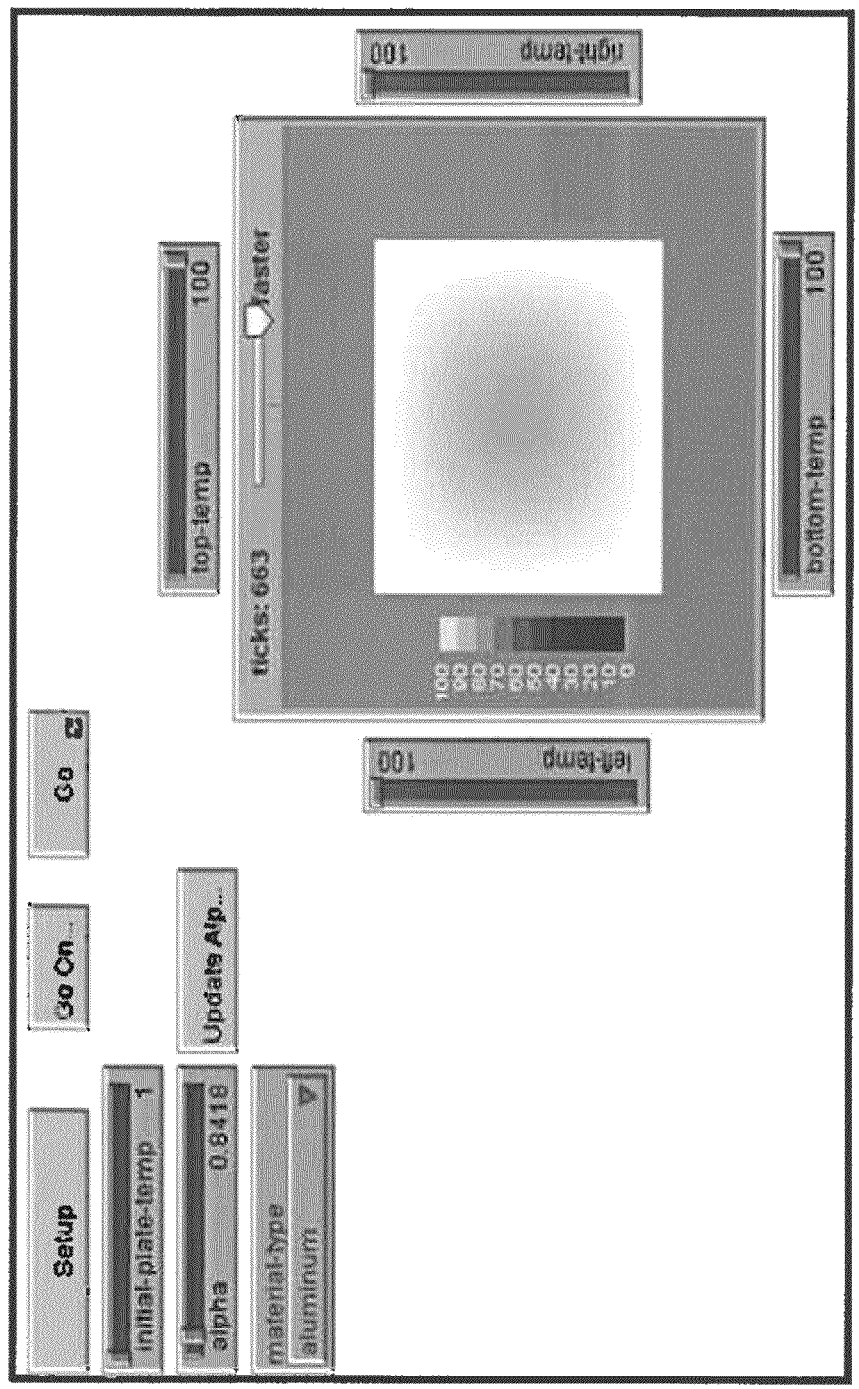
FIG. 4 illustrates a graphical user interface of a program executing a Heat Propagation in Time (HPT) model, according to an embodiment of the present invention.
Figure 5:
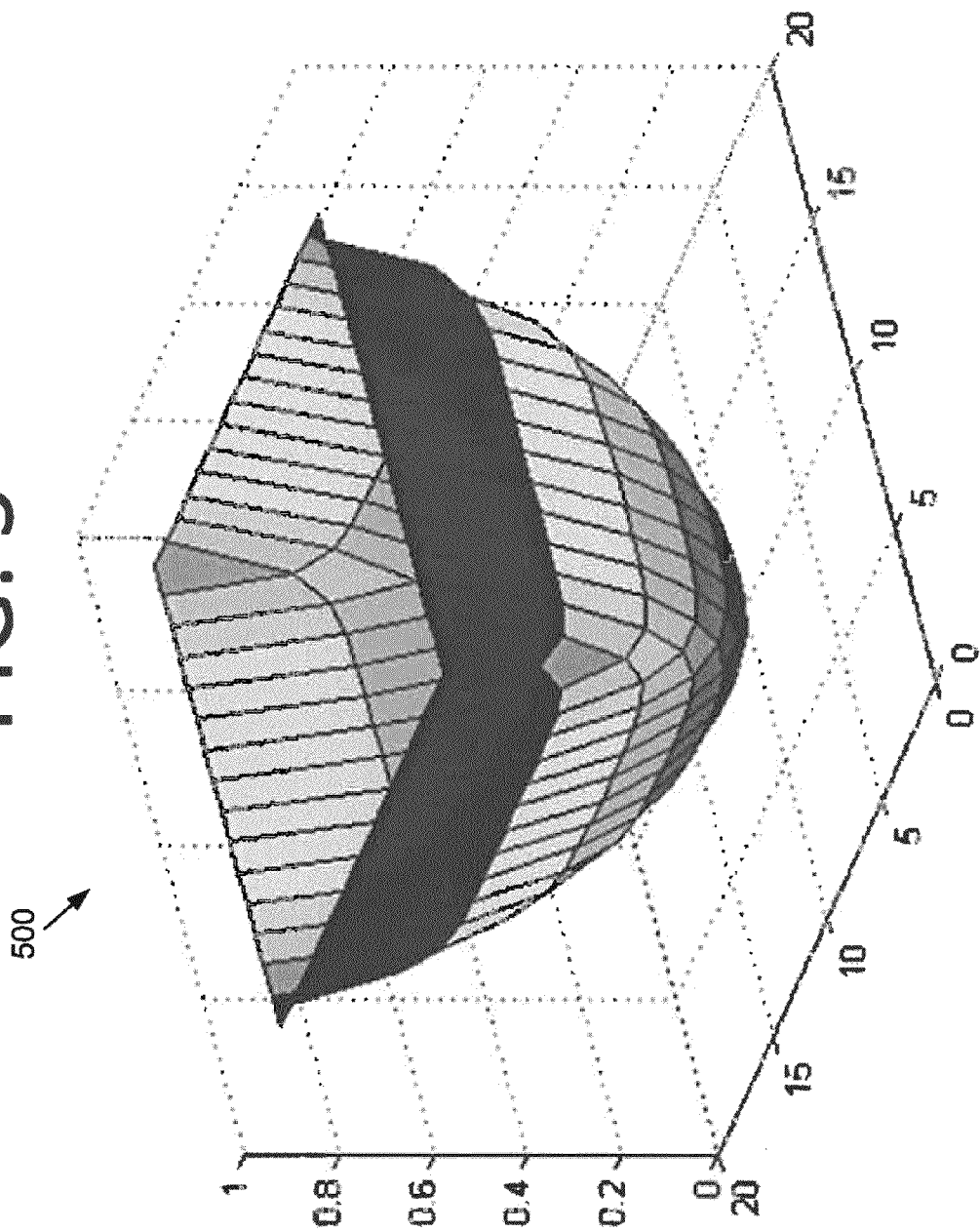
FIG. 5 illustrates a three dimensional graph of the surface of a TMV correction matrix, according to an embodiment of the present invention.

The global trend is reduced by this subtrahend positive bias. The trend is the last IMF that can't be refined by more sifts. It is the most slowly varying component of the input signal. The fast-varying component noise in the reference pixels represents hypothetical heat from underlying complementary-symmetry metal-oxide-semiconductor ("CMOS") multiplexing and readout electronics. The remaining reference signal trend in all its reference pixels is averaged and the trend average is subtracted from each active pixel, resulting in trend average amplitude and adjusted to include the absolute value of the MIN1s, or |MIN1s|. The reference signal trend is the global trend minus the subtrahend positive bias which was used to add to the fast-varying IMFs to make them positive. The inner reference pixel square perimeter amplitudes are replaced by {IMF1s+|MIN1s|} and then propagated into the active pixels squares noise correction array F (initialized to 0s) using heat propagation in time (HPT) implemented as a computer program or thermal model verification (TMV) with initial boundary condition Q(0)={IMF1s+|MIN1s|}. A noise correction array F is then derived based on the boundary condition Q(0) using imbedded squares method HPT that derives noise correction array F, and the noise correction array F is subtracted from the active pixels array, yielding corrected active pixels. FIGS. 4 and 5 can be used for array F formulation and visualization.

FIG. 1 illustrates a sensor array 100. Sensor array 100 includes "hot" pixels 110 that detect photon emissions. Surrounding hot pixels 110 are reference pixels 120 that do not detect photon emissions. It is the data from reference pixels 120 that may be used to correct noise in the digital domain. For the H2RG sensor instance, where digit 2 indicates the sensor size 2K×2K, where K=1024), the reference pixel frame is four pixels wide, providing 32,736 reference pixels. This represents a large amount of information that can be used for noise correction.

Figure 2:
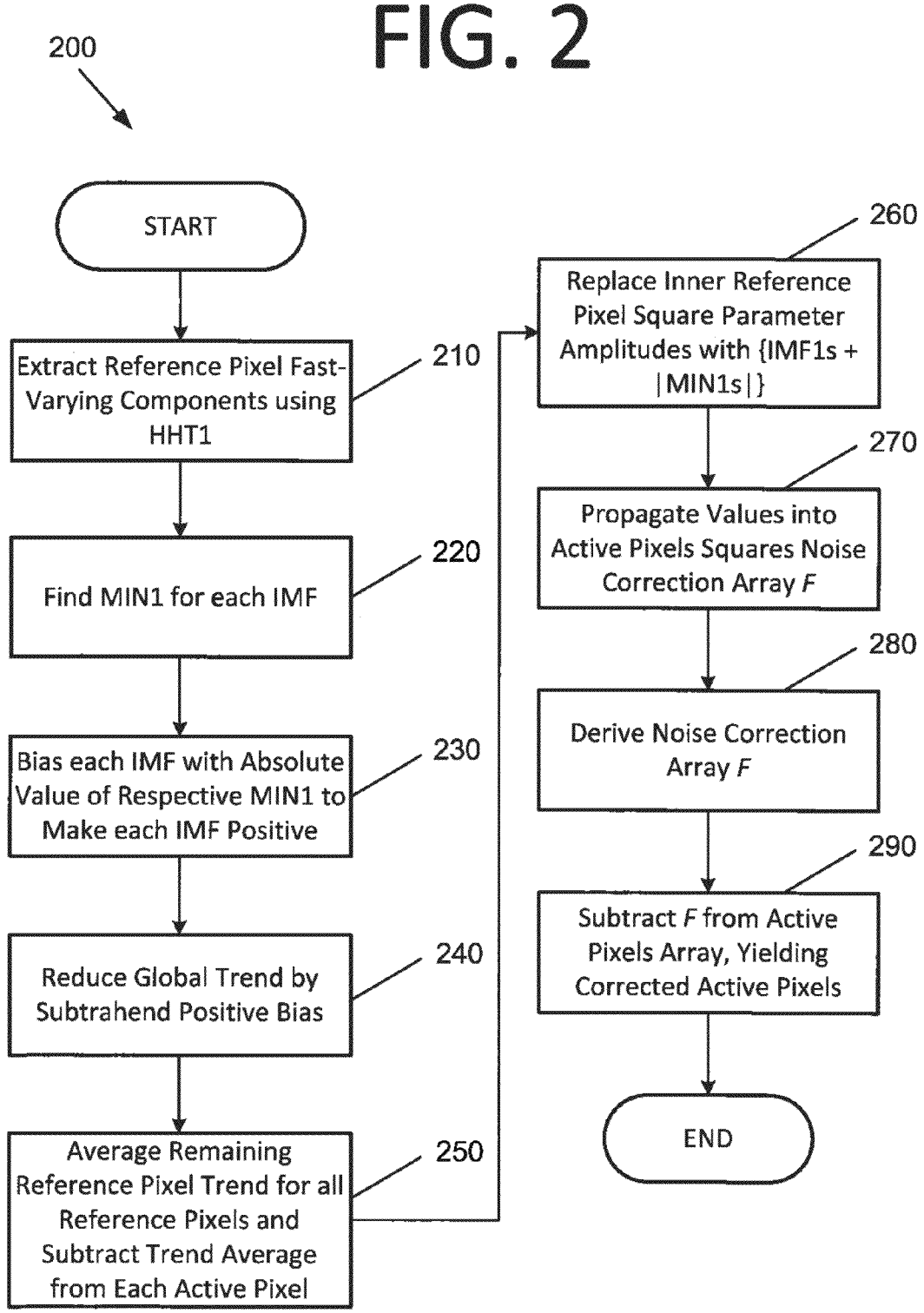
FIG. 2 is a flowchart illustrating a method of correcting for fast-varying noise components, according to an embodiment of the present invention.

FIG. 2 is a flowchart 200 illustrating a method of correcting for fast-varying noise components, according to an embodiment of the present invention. In some embodiments, the method of FIG. 2 may be performed, for example, by the computing system 300 of FIG. 3. The method begins with extracting the reference pixel fast-varying components using a HHT in one dimension (HHT1) at 210. Next, the minimum (MIN1) is found in each IMF at 220, and the IMF is biased with the absolute value of each MIN1 to make the IMF positive at 230.

The global trend is reduced by this subtrahend positive bias at 240. The remaining reference signal trend in all its reference pixels is averaged and the trend average is subtracted from each active pixel at 250, resulting in trend average amplitude and adjusted to include the absolute value of the MIN1s, or |MIN1s|. The inner reference pixel square perimeter amplitudes are replaced by {IMF1s+IMIN1sI} at 260 and these values are then propagated into the active pixels squares noise correction array F at 270 (initialized to 0s) using heat propagation in time (HPT) implemented as a computer program or thermal model verification (TMV) with initial boundary condition Q(0)={IMF1s+IMIN1sI}. A noise correction array F is then derived at 280 based on the boundary condition Q(0) using imbedded squares method HPT that derives noise correction array F, and the noise correction array F is subtracted from the active pixels array at 290, yielding corrected active pixels. The process then ends, or may be performed for other sensor arrays in a multi-array detection system.

Figure 3:
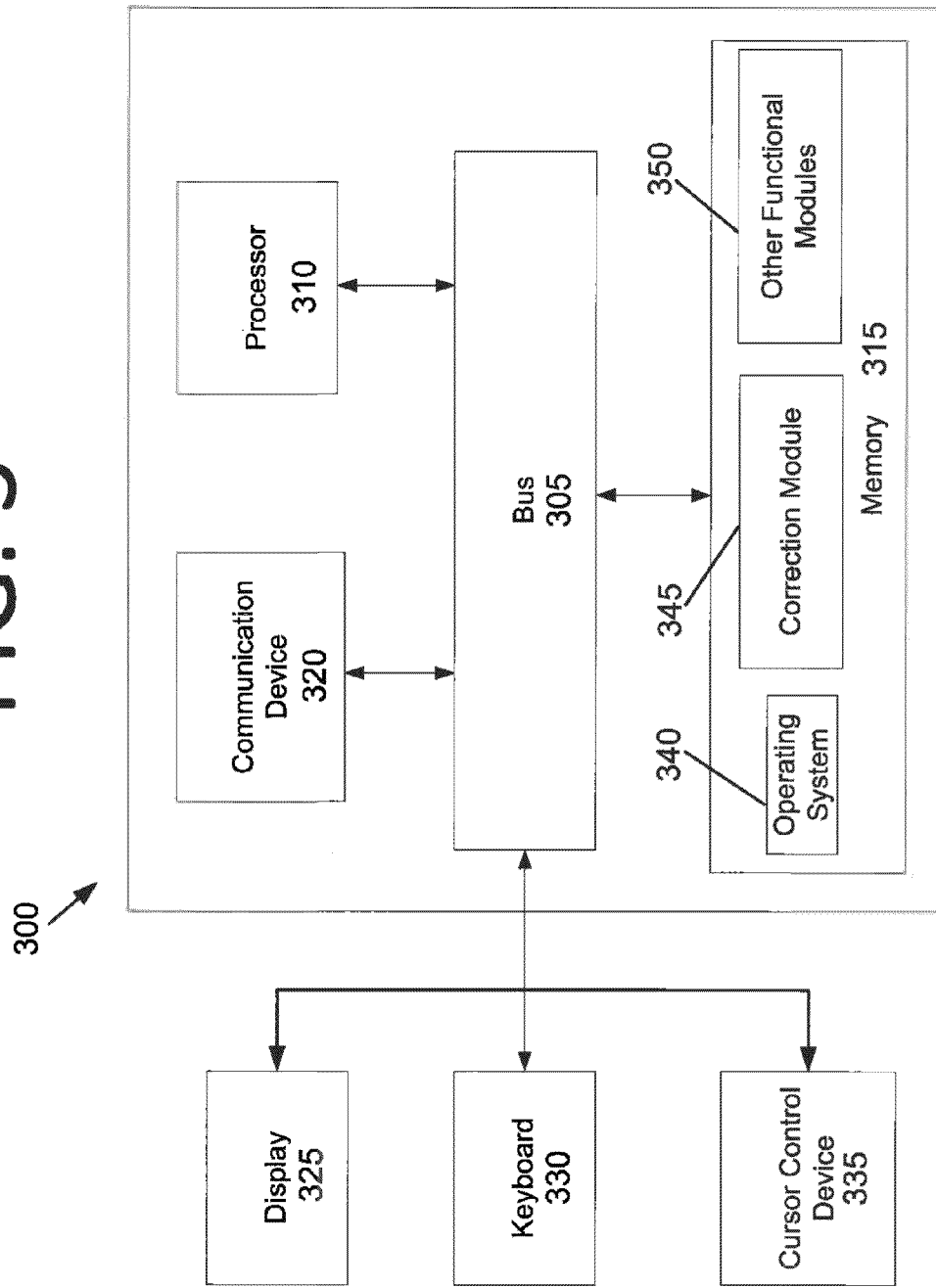
FIG. 3 illustrates a computing system, according to an embodiment of the present invention.

FIG. 3 illustrates a computing system, according to an embodiment of the present invention. System 300 includes a bus 305 or other communication mechanism for communicating information, and a processor 310 coupled to bus 305 for processing information. Processor 310 may be any type of general or specific purpose processor, including a central processing unit (CPU) or application specific integrated circuit (ASIC). System 300 further includes a memory 315 for storing information and instructions to be executed by processor 310. Memory 315 can be comprised of any combination of random access memory (RAM), read only memory (ROM), flash memory, cache, static storage such as a magnetic or optical disk, or any other types of non-transitory computer-readable media or combinations thereof. Additionally, system 300 includes a communication device 320, such as a wireless network interface card, to provide access to a network.

Non-transitory computer-readable media may be any available media that can be accessed by processor 310 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor 310 is further coupled via bus 305 to a display 325, such as a Liquid Crystal Display ("LCD"), for displaying information to a user. A keyboard 330 and a cursor control device 335, such as a computer mouse, are further coupled to bus 305 to enable a user to interface with system 300. However, in certain embodiments such as those for mobile computing implementations, a physical keyboard and mouse may not be present, and the user may interact with the device solely through display 325 and/or a touchpad (not shown). Any type and combination of input devices may be used as a matter of design choice.

In one embodiment, memory 315 stores software modules that provide functionality when executed by processor 310. The modules include an operating system 340 for system 300. The modules further include a correction module 345 that identifies, and performs noise correction for, fast-varying reference pixels. System 300 may include one or more additional functional modules 350 that include additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory ("RAM"), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The method steps performed in FIG. 2 may be performed by a computer program, encoding instructions for the nonlinear adaptive processor to perform at least the methods described in FIG. 2, in accordance with an embodiment of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the methods described in FIG. 2, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

FIG. 4 illustrates a graphical user interface 400 of a program executing a Heat Propagation in Time (HPT) model, according to an embodiment of the present invention. The program shows how noise recorded on the reference pixels propagates across the active pixels. The initial temperature value is set to 100 on all edges and 0 inside the plate.

FIG. 5 illustrates a three dimensional graph 500 of the surface of a TMV correction matrix, according to an embodiment of the present invention. TMV uses fabricated reference pixel data for the edges of the correction matrix and propagates the data in a four-quadrant pattern. The data is propagated across the rows and up or down the columns, as necessary, so that the numbers decrease from all directions as they reach the middle of the matrix.

Some embodiments of the present invention correct for noise in fast-varying reference pixels by identifying and extracting fast-varying components, or IMFs, in an HHT. A noise correction array is derived, and the noise correction array is subtracted from an active pixels array. This yields corrected active pixels.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

In order to determine the metes and bounds of the invention, therefore, reference should be made to the appended claims.

The invention claimed is:

1. A computer program embodied on a non-transitory computer-readable storage medium, the computer program configured to cause a processor to:
   extract reference pixel fast-varying components (IMFs) using Hilbert-Huang Transform Real-Time Data Processing (HHT1);
   derive a noise correction array based on a boundary condition equal to a first plurality of IMFs plus an absolute value of respective minimums of the IMFs, using an embedded squares method heat propagation model; and
   subtract the noise correction array from an active pixels array to yield active corrected pixels.

2. The computer program of claim 1, wherein the computer program is further configured to cause the processor to:
   find a minimum for each IMF and bias each IMF.

3. The computer program of claim 2, wherein the biasing of each IMF comprises biasing each IMF with an absolute value of its one-dimensional minimum to make each IMF positive.

4. The computer program of claim 2, wherein the computer program is further configured to cause the processor to:
   reduce a global trend by a subtrahend positive bias derived from the biased IMFs.

5. The computer program of claim 4, wherein the computer program is further configured to cause the processor to:
   average a remaining reference pixel trend for all reference pixels after the global trend reduction.

6. The computer program of claim 1, wherein the computer program is further configured to cause the processor to:
   replace inner reference pixel square parameter amplitudes with the IMFs plus the absolute value of their respective minimums.

7. The computer program of claim 6, wherein the computer program is further configured to cause the processor to
   propagate the replaced amplitudes into an active pixels squares noise correction array.

8. The computer program of claim 1, wherein the computer program is further configured to cause the processor to determine active corrected pixels for a plurality of sensor arrays comprising active pixels and reference pixels.

9. The computer program of claim 1, wherein noise correction is performed in a digital domain only.

10. The computer program of claim 1, wherein the HHT1 is implemented as a one-dimensional HHT that facilitates the entire error correction to run in real-time.

11. A computer-implemented method, comprising:
    extracting reference pixel fast-varying components (IMFs) using a Hilbert-Huang Transform Real-Time Data Processing System (HHT1);
    biasing each IMF with an absolute value of the one-dimensional minimum of the IMF to make each IMF positive;
    replacing inner reference pixel square parameter amplitudes with the IMFs plus the absolute value of their respective minimums;
    propagating the replaced amplitudes into an active pixels squares noise correction array;
    deriving a noise correction array based on a boundary condition equal to the IMFs plus the absolute value of their respective minimums, using an embedded squares method heat propagation model; and
    subtracting the noise correction array from the active pixels squares noise correction array to yield active corrected pixels.

12. The computer-implemented method of claim 11, further comprising:

reducing a global trend by a subtrahend positive bias derived from the biased IMFs.

13. The computer-implemented method of claim 12, further comprising:
averaging a remaining reference pixel trend for all reference pixels after the global trend reduction.

14. The computer-implemented method of claim 11, wherein the noise results from thermal noise in multiplexing and readout electronics.

15. The computer-implemented method of claim 11, wherein the active corrected pixels are determined for a plurality of sensor arrays comprising active pixels and reference pixels.

16. The computer-implemented method of claim 11, wherein the noise correction is performed in the digital domain only.

17. An apparatus, comprising:
physical memory comprising computer program instructions; and
a processor configured to execute the computer program instructions, wherein the processor is configured to:
extract reference pixel fast-varying components (IMFs) using a Hilbert-Huang Transform Real-Time Data Processing System (HHT1);
find a minimum for each IMF and bias each IMF with the absolute value of the one-dimensional minimum of the IMF to make each IMF positive;
reduce a global trend by a subtrahend positive bias derived from the biased IMFs;
average a remaining reference pixel trend for all reference pixels after the global trend reduction;
replace inner reference pixel square parameter amplitudes with the IMFs plus the absolute value of their respective minimums;
propagate the replaced amplitudes into an active pixels squares noise correction array;
derive a noise correction array based on a boundary condition equal to the IMFs plus the absolute value of their respective minimums, using an embedded squares method heat propagation model; and
subtract the noise correction array from the active pixels squares noise correction array to yield active corrected pixels.

18. The apparatus of claim 17, wherein the noise results from thermal noise in multiplexing and readout electronics.

19. The apparatus of claim 17, wherein the active corrected pixels are determined for a plurality of sensor arrays comprising active pixels and reference pixels.

20. The apparatus of claim 17, wherein the noise correction is performed in the digital domain only.

* * * * *